(12) United States Patent
Schorn et al.

(10) Patent No.: US 6,814,321 B2
(45) Date of Patent: Nov. 9, 2004

(54) FOOD PROCESSOR COMPRISING MEMORY MEANS FOR STORING OPERATIONAL DATA

(75) Inventors: Matthias Schorn, Moosburg (AT); Roland Dorfer, Keutschach (AT); Herbert Kampitsch, Maria Elend im Rosental (AT); Thomas Sigot, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/191,022

(22) Filed: Jul. 8, 2002

(65) Prior Publication Data

US 2003/0010853 A1 Jan. 16, 2003

(30) Foreign Application Priority Data

Jul. 13, 2001 (EP) ............................................. 01890208

(51) Int. Cl.$^7$ .............................................. B02C 25/00
(52) U.S. Cl. .......................................... 241/36; 366/601
(58) Field of Search .................................. 366/601, 206; 241/30, 36, 375, 282.1, 282.2

(56) References Cited

U.S. PATENT DOCUMENTS

| 4,541,573 A | 9/1985 | Fujiwara et al. ............... 241/36 |
| 4,822,172 A | * 4/1989 | Stottmann .................... 366/142 |

FOREIGN PATENT DOCUMENTS

EP        0331142    * 9/1989

* cited by examiner

Primary Examiner—Mark Rosenbaum
(74) Attorney, Agent, or Firm—Aaron Waxler

(57) ABSTRACT

The invention relates to a food processor (1) with a motor (M) to drive at least one tool and with input means (13 to 18) to switch on at least one operating process, with a microcomputer (43) to control the operating processes and realize a detection stage (44) for the detection of the interruption of an operating process, which microcomputer contains a memory (50) for storing operating values present immediately before the interruption of an operating process, the microcomputer (43) being designed to start the continuation of an interrupted operating process following an activation of a reactivation switch (13 to 18) provided for the reactivation purpose, the reactivation switch (13 to 18) preferably being formed by the operating-mode switch (13 to 18) concerned.

4 Claims, 3 Drawing Sheets

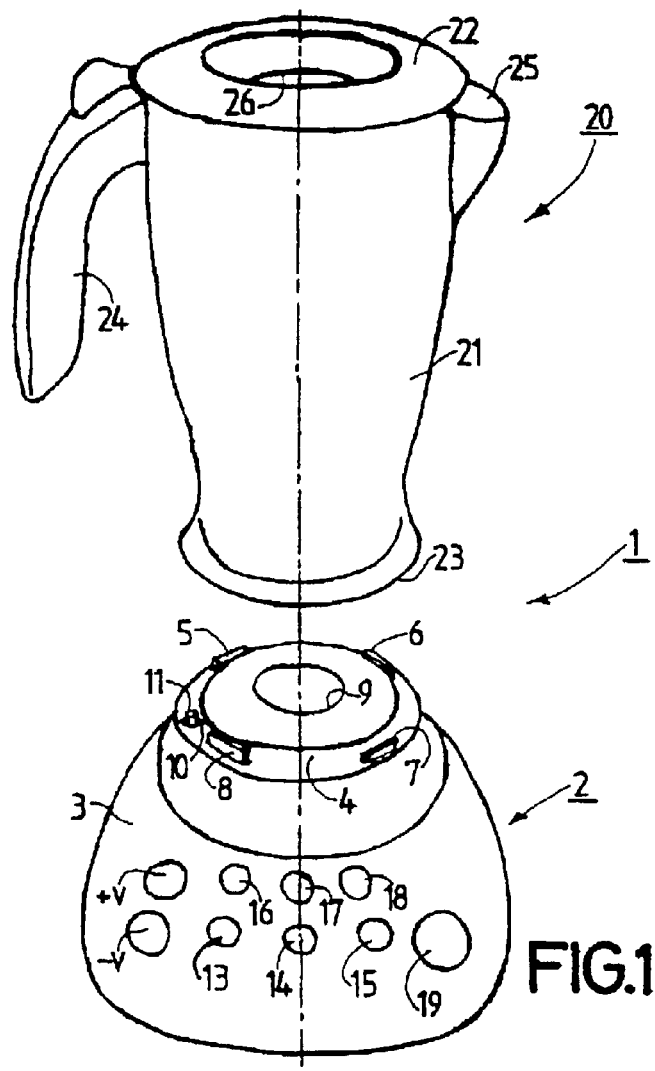
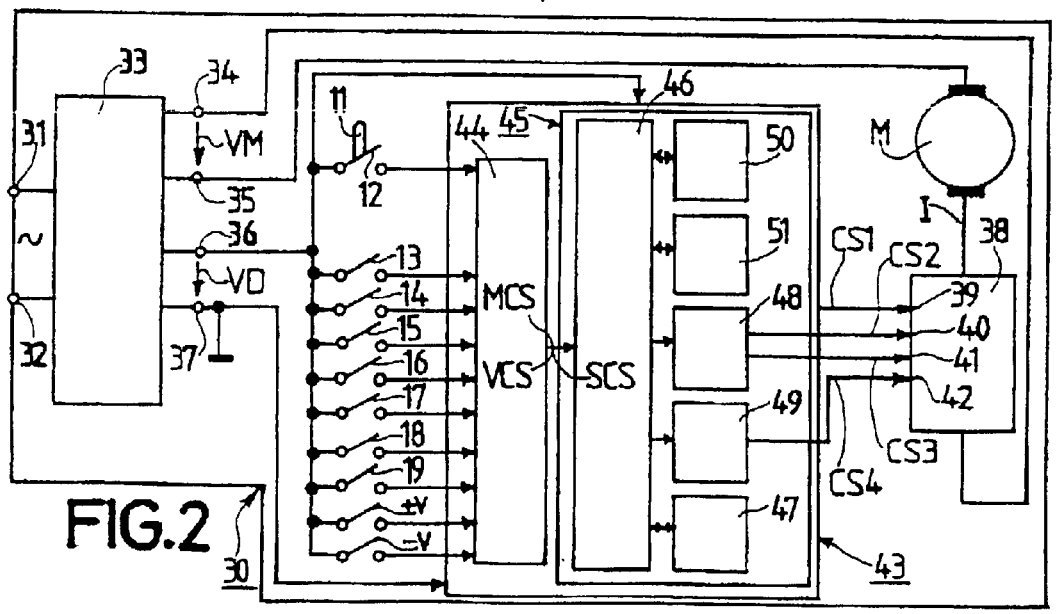

FOOD PROCESSOR COMPRISING MEMORY MEANS FOR STORING OPERATIONAL DATA

The invention relates to a food processor with a motor, and with at least one tool which can be driven by the motor, and with at least one activatable input means for switching on at least one operating process of the food processor, and with operating-process control means, which operating process control means are designed to control the at least one operating process of the food processor, different operating values being present in succession during the execution of the at least one operating process, which operating values may be amended, if required, with the aid of the control means for the operating process.

A food processor of the kind set forth in the first paragraph is known from, for example, the patent document U.S. Pat. No. 4,541,573 A. The control means for the operating process in the known food processor are realized with the aid of a microcomputer which enables control of a multiplicity of operating processes. For example, a kneading process or a chopping process or a mixing process may be controlled and undertaken. In the known food processor, different motor speed values and overall process duration values can be realized by means of the microcomputer provided as the controlling means for the operating process. Furthermore, it is possible to realize different speed profiles for the known food processor. The known food processor, however, is not provided with means or measures to come into operation when an operating process switched on with the aid of a button provided as the input means is interrupted during the execution of the operating process, for example, to be able to add as yet to a receptacle of the food processor an ingredient forgotten before the initial activation of an operating process. If such an action is necessary, in the known food processor, an operating process already initiated must be terminated by switching off the food processor; however, after the addition as yet of a previously forgotten ingredient, the required operating process then has to be started again from the beginning.

It is an object of the invention to eliminate the drawback described above and to realize an improved food processor.

To achieve the object cited above, a food processor according to the invention is provided with features such that a food processor according to the invention can be characterized as follows:

A food processor with a motor, and with at least one tool which can be driven by the motor, and with at least one activatable input means for switching on at least one operating process of the food processor, and with operating-process control means which operating-process control means are designed to control the at least one operating process of the food processor, different operating values being present in succession during the at least one operating process, wherein detecting means being provided, which are designed for detecting the interruption of the at least one operating process, and wherein memory means being provided which are designed for storaging of the operating values present immediately before the interruption of the at least one operating process, and wherein at least one activatable reactivating means being provided which is designed for reactivating the at least one previously interrupted operating process, and wherein the control means for the operating process being designed for starting the continuation of the at least one interrupted operating process following an activation of the at least one reactivating means.

By provision of the features according to the invention, it is achieved in a simple manner that the execution of an operating process carried out with the food processor according to the invention can be interrupted at any state of the process and subsequently can be continued as from the same process state, because the operating values or operating data present in the food processor before the interruption of an operating process can be stored in the memory means provided for this purpose and after reactivation of the food processor or the previously interrupted operating process, the interrupted operating process can be continued with the aid of the operating values previously stored in the memory means. Through provision of the features according to the invention, unnecessarily long operating times are avoided in a food processor according to the invention since, after a deliberate interruption of an activated operating process, this operating process is not run through again from the beginning, but is continued at the process state at which the interruption of the operating process took place. Through provision of the features according to the invention it is also achieved that even in the case of multiple interruptions of a running operating process, unusable operating results are prevented and overloading of the motor is avoided.

In a food processor according to the invention it has proved particularly advantageous if the features as claimed in claim 2 are additionally provided. This offers the advantage that a reactivation of an interrupted operating process is possible only if this reactivation takes place within a predefined time period. This is practically always the case when an interruption of an operating process has been deliberately undertaken by a user of the food processor, since it can then be assumed that the reactivation will also be deliberately undertaken by the user within the predefined time period. On the other hand, there is a high probability that an unwanted reactivation will be prevented; such an unwanted reactivation could occur, for instance, if a child were to initiate an interruption of a started operating process in an unintentional manner.

In a food processor according to the invention it has also proved very advantageous if the features as claimed in claim 3 are additionally provided. The storing of the momentary motor current value and the momentary operating duration value has proved especially important and advantageous in practice, since these are the most important operating values of a food processor. It is to be noted, however, that storage of information on direction of rotation, representing the momentary direction of rotation of the motor, is also useful.

In a food processor according to the invention, the activatable reactivation means may be formed by, for example, a separate reactivation button. For a food processor according to the invention however, it has proved very advantageous if the features as claimed in claim 4 are additionally provided. In this manner it is achieved that each operating process of the food processor is provided with its own reactivating means, which own reactivating means is formed by the input means provided for switching on the operating process in question.

The aspects cited above and further aspects of the invention are apparent from the embodiments described below and are explained on the basis of these embodiments.

The invention will be described in detail with reference to an embodiment shown in the drawings to which, however, the invention is not restricted.

FIG. 1 is an oblique view from above of an embodiment of a food processor according to the invention.

FIG. 2 shows part of the electrical circuit of the food processor according to FIG. 1.

Figure 3:
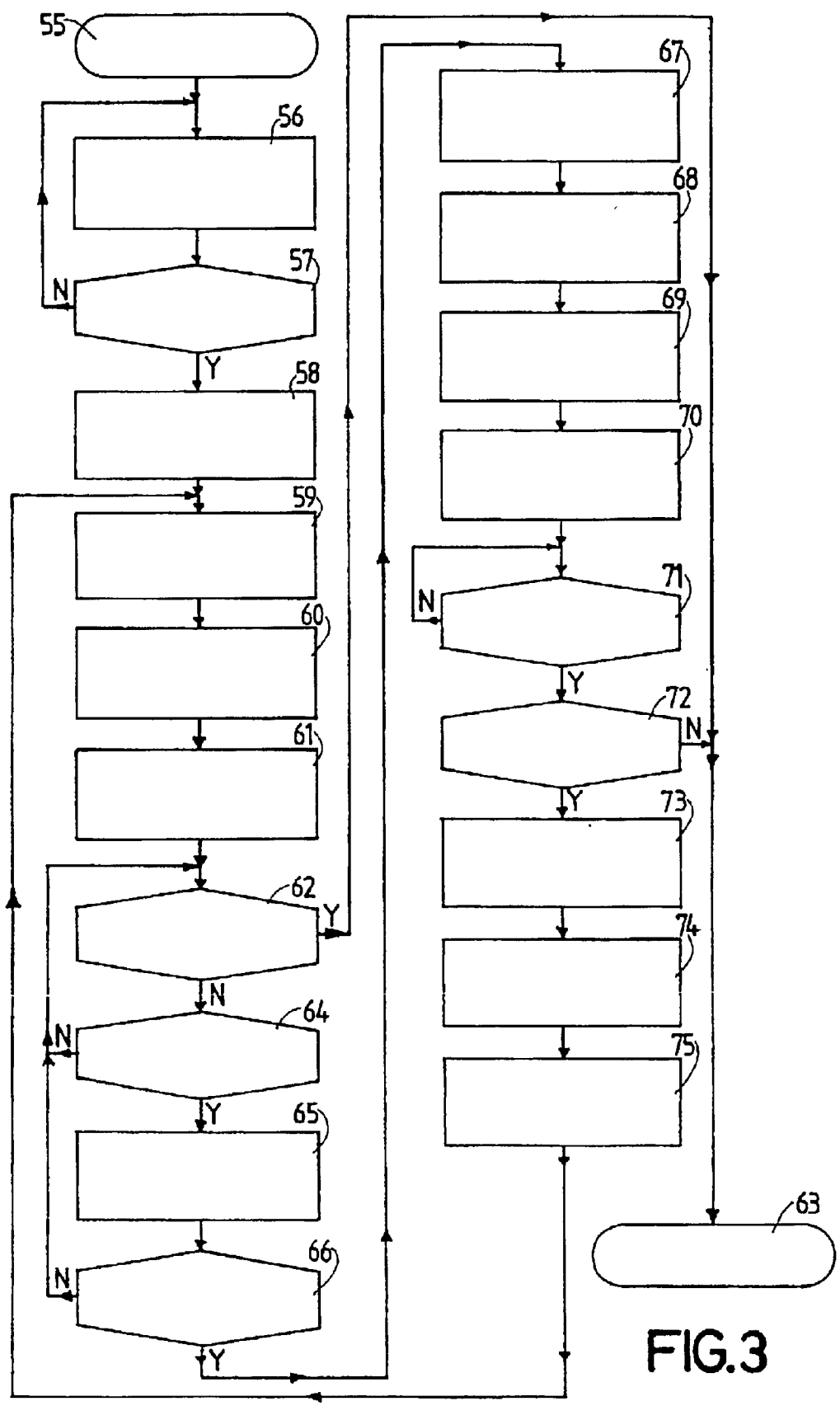
FIG. 3 shows a flowchart of an operating process that can be implemented with the food processor according to FIG. 1.

FIG. 1 shows a food processor which is known as a free-standing mixer. For the food processor 1 several operating modes can be selected and thereby several operating processes performed, which operating modes and operating processes differ from one another in that different tools are used, that the speeds of the tools are different, that the directions of rotation of the tools are different, that the lengths of the time periods for driving the tools are different, that tools can be operated at increasing speed and decreasing speed, and that pulsed driving of a tool is possible.

The food processor 1 is equipped with a drive unit 2. The drive unit 2 includes a housing 3. The housing 3 accommodates a motor M, which is not shown in FIG. 1. Using the motor M, a coupling piece (not shown in FIG. 1) can be driven in rotation via a drive device. The housing 3 includes a setdown area 4. The setdown area 4 is provided with a total of four positioning ribs 5, 6, 7 and 8 which in addition form constituent parts of so-called bayonet closures; however, this is not shown in detail in FIG. 1. In the setdown area 4, there is also provided a passage 9 through which the previously mentioned coupling piece is accessible for a counter-coupling piece. The setdown area 4 is also provided with a further passage 10 through which a button 11 of a safety switch 12 (not shown in FIG. 1) projects.

On the drive unit, or on the housing 3 of the drive unit 2, six operating-mode switches 13, 14, 15, 16, 17 and 18 are provided as activatable input means for switching on the different operating modes and, consequently, the operating processes of the food processor 1. Each of the six operating-mode switches 13 to 18 is provided for switching on at least one operating mode or at least one operating process. Furthermore, there is provided a stop button 19 whose actuation can interrupt or terminate an operating process. Furthermore, two supplementary buttons +v and −v are provided, whose actuation enables the speed of a mixer tool to be increased or decreased. The operating-mode switches 13 to 18 and the stop button 19 as well as the supplementary buttons +v and −v are formed by activatable touch keys.

The food processor 1 is also equipped with a mixing bowl 20. The mixing bowl 20 consists of a container 21 and a lid 22 that is removably attached to the container 21. The container 21 is equipped, on its side which is remote from the lid 22, with a counter-setdown area 23. The counter-setdown area 23 can be set down on the setdown area 4 of drive unit 2 and can be rotated in relation to the setdown area 4, when the mixing bowl 20 is rotated in such a way in relation to drive unit 2, a bayonet closure is formed in each case with the aid of the positioning ribs 5 to 8. The mixing bowl 20 is also equipped with a handle 24 and a pouring spout 25. It should also be mentioned that the lid 22 is provided with an opening 26 where through food to be processed can be introduced into the container 21.

In the container 21 of the mixing bowl 20 a mixing tool, which can be driven in rotation, is accommodated in known manner, which tool is, however, not shown in FIG. 1. The mixing tool is connected to the already mentioned counter-coupling piece, which counter-coupling piece is surrounded by the counter-setdown area 23. The mixing tool can thus be driven in rotation via the counter-coupling piece and the coupling piece of the drive unit 2, drivable by the motor M, as has been known for a long time.

The mixing bowl 20 is adjustable in relation to the drive unit 2 between a non-operating position and an operating position. In FIG. 1, the mixing bowl 20 is shown in its non-operating position in which the mixing bowl 20 is removed from the drive unit 2. As already mentioned, the mixing bowl 20 can be set down with its counter-setdown area 23 on the setdown area 4 of the drive unit 2, and can be rotated in relation to the drive unit 2; the mixing bowl 20 then assumes its operating position. As already mentioned above, a safety switch 12 is connected to the drive unit 2, of which safety switch the button 11 is visible in FIG. 1. The safety switch 12 can be activated when the mixing bowl 20 is adjusted from its non-operating position shown in FIG. 1 to its operating position which is not shown in FIG. 1; this is accomplished by the mixing bowl 20 with its counter-setdown area 23 coming into active connection with the button 11, thereby depressing the button 11, thus sausing the safety switch 12 to be activated, that is, closed in the case considered here.

In the case of the food processor 1, in addition to the mixing bowl 20 a further working container, not shown in FIG. 1 for the sake of simplicity, can be set down on the setdown area 4 of the drive unit 2; a kneading tool, for example, can thus be introduced in a manner as known per se into this working container, which kneading tool can also be driven in rotation with the aid of the motor M in order to produce a dough by way of a kneading process.

In the case of the food processor 1 a further working container, not shown in FIG. 1, can also be set down on setdown area 4 of the drive unit 2, which working container is used when performing a chopping process for chopping onions. This working container contains in a manner known per se a chopping blade with the aid of which onions or other vegetables can be chopped easily and quickly.

In the case of the food processor 1 according to FIG. 1 a multiplicity of tools are thus provided, which tools are intended for different operating processes and can be driven in different ways.

The part 30 of the electrical circuit, as shown in FIG. 2, of the food processor 1 according to FIG. 1 shows that two mains connections 31 and 32 are provided, which mains connections are connected to a mains cable which is not shown. Connected to the two mains connections 31 and 32 is a voltage processing circuit 33. The voltage processing circuit 33 is used to generate from the mains voltage received a motor supply voltage VM, which is available at two outputs 34 and 35 of the voltage processing circuit 33. The voltage processing circuit 33 can also generate a supply direct voltage VD, which is available at two further outputs 36 and 37 of the voltage processing circuit 33.

The motor supply voltage VM serves to supply the motor M. For this purpose the motor supply voltage VM is applied to a series circuit comprising the motor M and a motor supply circuit 38. The motor supply circuit 38 is designed such that it can be used to drive the motor M at different speeds and with mutually opposing directions of rotation. The relevant speed of the motor M is then determined by the relevant motor current I. The relevant speed and, therefore, the relevant motor current I and the relevant direction of rotation of the motor M, are then determined by the specific operating process selected, which process can be switched on using one of the six operating-mode switches 13 to 18. The motor supply circuit 38 is equipped with a total of four control inputs 39, 40, 41 and 42. Via the first control input 39, an initial control signal CS1 can be applied to the motor supply circuit 38; the actuation of the motor M can be enabled by means of said initial control signal CS1. A second control signal CS2 can be applied to the second control input 40, and a third control CS3 can be applied to the third control input 41. Using the two control signals CS2 and CS3, a setpoint value can be defined for the motor current I. A fourth control signal CS4 can be applied to the fourth control input 42. Using the fourth control signal CS4, the relevant direction of rotation of the motor can be defined.

The food processor 1 also contains a microcomputer 43. Using the microcomputer 43, a number of means and functions can be realized, of which, however, only the means and functions which are of importance in the present context will be described in greater detail below. A simply designed microcontroller or a hard-wired logic circuit designed in integrated technology may also be provided instead of the microcomputer 43.

Using the microcomputer 43, detection means 44 are realized. The detection means 44 serve for the detection of actuations of the safety switch 12 and the operating-mode switches 13 to 18 and the stop button 19 as well as the supplementary buttons +v and −v. Using the detection means 44, detection of the interruption and, if applicable, the termination of a previously initiated operating process can be ascertained by opening the safety switch 12 and closing the stop button 19. The detection means 44 are, therefore, designed for the detection of an interruption of the operating processes that can be performed with the food processor 1. The detection means 44 are also designed to generate control signals, that is, specifically operating-mode control signals MCS and speed control signals VCS and a stop control signal SCS.

Using the microcomputer 43, operating-process control means 45 are also realized. The operating-process control means 45 are designed to control the operating processes of the food processor 1. During each such operating process, different operating values are present in succession, specifically different motor-current values of the motor current I and different control information on direction of rotation, which information represents the direction of rotation of the motor M, and different operating-duration values which represent the time duration already elapsed of an operating process.

The operating-process control means 45 include sequence-control means 46 and first time-counting means 47 and first output means 48 and second output means 49 and memory means 50 and second time-counting means 51.

The sequence-control means 46 are provided to control the execution of the various operating processes which can be controlled using the operating-process control means 45.

The first time-counting means 47 are provided to count the particular elapsed time duration of an activated operating process.

The first output means 48 are provided to output a setpoint value for the motor current I. This setpoint value is output using two control signals CS2 and CS3, which signals are applied to the control inputs 40 and 41 of the motor supply circuit 38.

The second output means 49 are provided to output rotation-direction control information on the direction of rotation of the motor M. This rotation-direction control information is output in the form of a control signal CS4 which is applied to the fourth control input 42 of the motor supply circuit 38.

The initial control signal CS1, being applied to the initial control input 39 of the motor supply circuit 38, is supplied directly by the operating-process control means 45.

The memory means 50 are designed to store the operating values present immediately before the interruption of an operating process, thus in the present case the motor current value of the motor current I that is present immediately before the interruption of an operating process and the motor-rotation-direction control information present immediately before interruption of an operating process as well as the operating-duration value present immediately before the interruption of an operating process.

The second time-counting means 51 are designed for determination of the elapsed interruption time duration between the interruption of an operating process and the start of the continuation of an operating process.

Below, the execution of an operating process is described in a general manner on the basis of the flowchart according to FIG. 3, which execution of the operating process can be interrupted.

The execution of an operating process is started in a block 55. Subsequently, the food processor is controlled in a waiting state in a block 56. In the further execution it is checked in a block 57 whether one of the operating-mode switches 13 to 18 for switching on an operating mode, and hence an operating process, is closed. If this is not the case, the execution is continued in block 56. If it is recognized in the block 57, however, that one of the operating-mode switches 13 to 18 has been actuated, the execution is continued in a block 58.

In the block 58 the initial time counter 47 is started. Subsequently, a setpoint value for motor current I, matching the operating process in question, is output to the motor supply circuit 38 in the form of the two control signals CS2 and CS3 by the first output means 48 in a block 59. Subsequently, in a block 60 the rotation-direction control information for the motor rotation direction of the motor M, matching the selected operating process, is output in the form of the fourth control signal CS4 by the second output means 49 to the motor supply circuit 38. Subsequently, in a block 61, the initial control signal CS1 for switching on the motor M is output by the operating-process control means 45 to the motor supply circuit 38.

Once the process steps described above have been performed, the processing of the food to be processed in conformity with the selected operating process takes place in the mixing bowl 20 or in a different working container while using the tool that is accommodated therein and driven by way of the motor M.

Subsequently, in a block 62 it is checked whether the entire operating-process time duration has expired. If this is the case, the sequence is terminated in a block 63; this may also mean that the execution will be started again in the block 55.

If, however, it is determined in the block 62 that the entire operating-process time duration has not yet expired, it is checked in a block 64 whether a user of the food machine intends to alter the speed of the tool by way of the supplementary buttons +v or −v. If this is not the case, the program execution is continued again in the block 62. However, should the check in the block 64 have a positive result, the execution is continued in the block 65. In the block 65, in conformity with the actuation of one of the two supplementary buttons +v and −v and the speed control signal VCS, then generated changed setpoint value for the motor current I is output, using the first output means 48; this gives rise to a corresponding change of the motor current I and, consequently, of the speed of the motor M.

After the block 65 it is checked in a block 66 whether the operating process in progress has been interrupted. Such an interruption can be initiated by opening the safety switch 12, involving the removal of the mixing bowl 20 or another working container from the drive unit 2, or by closing the stop button 19 which takes place by deliberate action by a user. If the operating process has not been interrupted, the execution is again continued in the block 62. If, however, an interruption of the operating process in progress has taken place, the execution is continued in a block 67.

In the block 67, the momentary operating-duration value determined using the initial time-counting means 47 is stored in the memory means 50. Subsequently, in a block 68 the momentary motor current value is stored in the memory means 50. Subsequently, in a block 69, the momentary motor rotation-direction control information is stored in the memory means 50. Subsequently, in a block 70 the second time counter is started, so that the elapsing interruption time duration is determined.

After this, in a block 71 it is checked whether precisely the same operating-mode switch has just been actuated, and hence closed, as was actuated to switch on the interrupted operating process, as was previously established in the block 57. If such an actuation of the same operating-mode switch was not performed, the sequence is continued in a block 71. If, however, the same operating-mode switch was re-activated and hence closed, the sequence is continued in a block 72. In the block 72 the counter state of the second time counter 51 is checked for whether this counter state corresponds to a time value smaller than a specific predefined time-duration threshold value. In the present case, the predefined time-duration threshold value has been selected at forty (40) seconds. However, any other time-duration threshold value can, of course, also be selected, for example, just 20 or 30 seconds, or higher time-duration threshold values of some minutes. It should be expressly stated that the time-duration threshold value can also be infinitely large, in other words, it is not essential for such a time-duration threshold value to be provided.

If it is recognized in the block 72 that the counter state of the second time counter 51 corresponds to a time value greater than the time-duration threshold value of forty (40) seconds, so that this time-duration threshold value has been exceeded, the execution is terminated in the block 63, i.e. the interrupted operating process is completely ended. If, on the other hand, it is recognized in the block 72 that the counter state of the second time counter 51 corresponds to a time value smaller than the time-duration threshold value of forty (40) seconds, the sequence is continued in a block 73.

In the block 73 the previously stored momentary operating-duration value is read out from the memory means 50 and sent to the sequence control means 44. Subsequently, in a block 74 the momentary motor current value is read out from the memory means 50 and output to the first output means 48. Subsequently, in a block 75 the momentary motor rotation-direction control information is read out from the memory means 50 and output to the second output means 49.

Subsequently, the sequence is continued in the block 59. This means that in the block 59 the momentary motor current value is output by the first output means 48 to the motor supply circuit 38. Furthermore, in the block 60 the momentary motor rotation-direction control information is then output by the second output means 49 to the motor supply circuit 38. Furthermore, in the block 61 provision is then made for the switching-on of the motor M by outputting the initial control signal CS1 to the motor supply circuit 38.

In other words, this means that the previously interrupted operating process is continued with precisely the operating state with which the operating process was previously interrupted.

In the case of the food processor 1, the operating-mode switches 13 to 18 thus constitute activatable reactivating means which are provided and designed for the reactivation of a previously interrupted operating process. Only if precisely the same operating-mode switch is activated, i.e. actuated as the reactivating means, can a previously interrupted operating process be restarted, and this will happen with the operating state at which the interruption took place. This is possible because the operating-process control means 45 are designed to commence the continuation of an interrupted operating process following an activation of an operating-mode switch provided as the reactivating means. Here it should again be pointed out that, in the case of the food processor according to FIG. 1, the operating-process control means 45 are designed to commence the continuation of an interrupted operating process following an activation of a reactivating means, i.e. following actuation of an operating-mode switch 13 to 18 on the condition that the elapsed interruption time duration determined by means of the second time-counting means 51 lies below a predefined time-duration threshold value.

Figure 4:
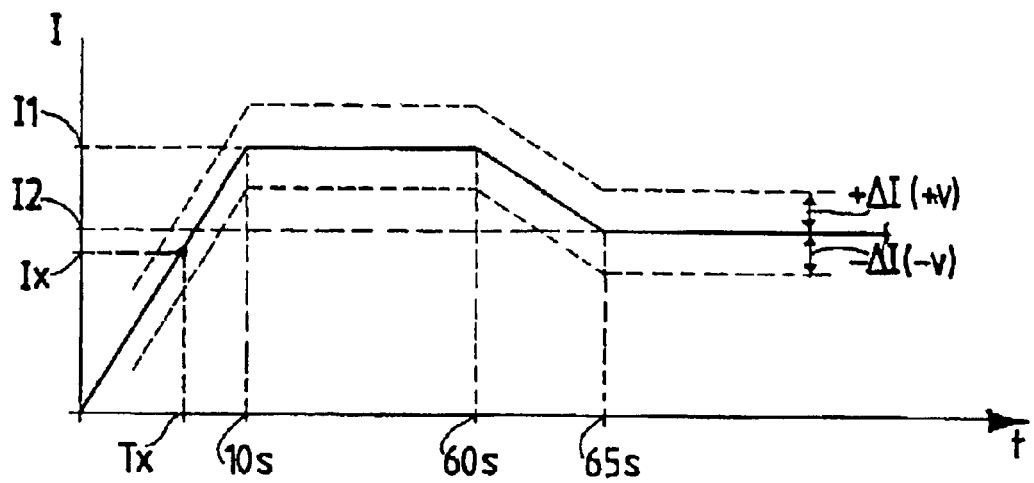
FIG. 4 shows in schematic form, as a function of the elapsing operating time, the variation of the motor current of the motor of the food processor according to FIG. 1 when executing a kneading process for producing dough.

In FIG. 4, the characteristic of the motor current I of the motor M of the food processor 1 when performing a kneading process for producing a dough is shown in schematic form as a function of the elapsed operating-time duration t. As is apparent from this sequence, the motor current I and, consequently, the motor speed of the motor M, increase continuously during the first ten (10) seconds and then remain constant for fifty (50) seconds at a current value I1 and are subsequently reduced for five (5) seconds, and then again remain constant, but at a reduced value I2. The kneading process is not switched off automatically in this case, and has to be deliberately carried out by the user. The schematic characteristic of the motor current I is matched precisely by the speed characteristic of the motor M.

On the assumption that at the time TX the kneading process is interrupted, the operating-duration value Tx and the motor-current value Ix and a motor-rotation-direction control information are stored in the memory means 50 of the operating-process control means 45.

Figure 5:
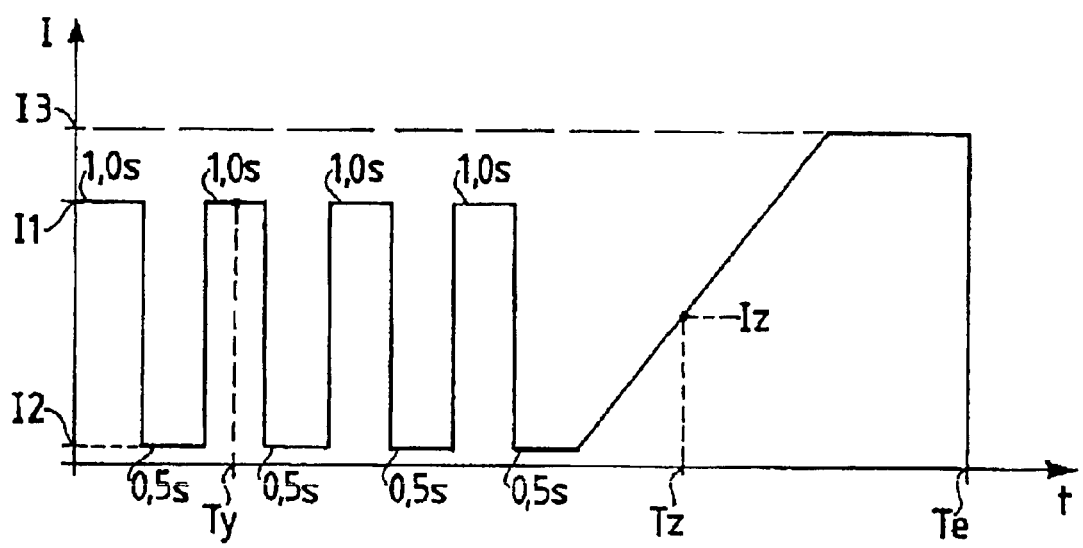
FIG. 5 shows, in a manner analogous to FIG. 4 and in schematic form, the variation of the motor current when executing a chopping process for chopping onions.

In FIG. 5, the characteristic of the motor current I of the motor M of the food processor 1 when performing a chopping process for chopping onions is shown in schematic form as a function of the elapsed operating-time duration t. In this chopping process, the motor M is initially operated pulse-wise, the motor-current value I being switched between a current value I1 and a current value I2, the motor current value I1 being predefined for one (1) second at a time and the motor current value I2 being predefined for a half (0.5) second at a time. Following pulse-wise operation of the motor M, the motor current I is continuously increased, specifically up to a maximum value of I3, which is then retained for a specific time duration, after which, at a time Te, the chopping process is terminated automatically. The schematic characteristic of the motor current I is matched precisely by the characteristic of the speed of the motor M.

If, during this chopping process, a deliberate interruption takes place at a time Ty, the operating-duration value Ty and the motor-current value I1 and a motor-rotation-direction control information are stored in the memory means 50, and are subsequently retrieved when the operating-mode switch for switching-on the chopping process is re-actuated within forty (40) seconds.

If the chopping process is interrupted at a time Tz, the operating-duration value Tz and the associated motor-current value Iz and the associated motor-rotation-direction control information are stored in the memory means 50. If subsequently the operating-mode switch for switching-on the chopping process is not actuated again, the operating values previously stored in the memory means 50 are no longer read out, and the chopping process is terminated.

The food processor 1 according to FIG. 1 it is provided not just with a mixing tool in the mixing bowl 20 and a kneading tool and a chopping tool in working containers designed to be suitable for the purpose, but also with cutting tools such as a cutting disk and a fast-running cutting blade and a beater tool, which, however, will not be further described here.

Regarding the input means, which simultaneously also constitute reactivating means, it should also be stated that such input and reactivating means do not necessarily have to be formed by operating-mode switches, but may also be formed by a remote-control device. It should also be mentioned that switching on an operating mode, and thereby an operating process, is not just possible through actuation of a single operating-mode switch, but can also be possible by, for example, simultaneous actuation of two operating-mode switches. Again, more than six operating-mode switches may also be provided.

The memory means for storing operating values do not have to be a constituent part of the operating-process control means 45 and may also be formed by storage means external to the operating-process control means 45.

It should also be noted that, in a food processor in which the motor can be operated only in a single direction of rotation, the storage of motor-rotation-direction control information is obviously superfluous.

In the food processor 1 as described above, when an operating process is interrupted, the momentary motor-current value is stored in the memory means 50, which momentary motor current value is proportional to the momentary motor speed. The motor speed can, however, also be determined by the voltage applied to the motor M, on interruption of an operating process the momentary motor voltage value then being stored in the memory means. A design can also be provided in which the motor M is equipped with a tacho-generator, with the aid of which a speed value representing the motor speed can be determined; on interruption of an operating process, the particular momentary speed value is then stored in the memory means 50.

What is claimed is:

1. A food processor (1)

with a motor (M), and with at least one tool, which can be driven by the motor (M), and with at least one activatable input means (13, 14, 15, 16, 17, 19) for switching on at least one operating process of the food processor (1) and, with operating process control, means (45) which operating-process control means (45) are designed to control the at least one operating process of the food processor (1), different operating values being present in succession during the at least one operating process, wherein detection means (44), being provided which are designed for detecting the interruption of the at least one operating process, and wherein memory means (50) being provided, which are designed for storing the operating values present immediately before the interruption of the at least one operating process, and wherein at least one activatable reactivating means (13, 14, 15, 16, 27, 18) being provided, which is designed for reactivating of the at least one previously interrupted operating process, and wherein the control means (45) for the operating process being designed for starting the continuation of the at least one interrupted operating process following an activation of the at least one reactivating means (13, 14, 15, 16, 17, 18).

2. A food processor (1) as claimed in claim 1, wherein time-counting means (51) being provided, which are designed for determining the interruption time-duration elapsed between the interruption of the at least one operating process and the commencement of the continuation of the at least one operating process, and wherein the operating-process controlling means (45) being designed for starting the continuation of the at least one interrupted operating process following an activation of the at least one reactivation means (13, 14, 15, 16, 17, 18) on condition that the elapsed interruption-time duration, determine by means of the time-counting means (51), is below a predefined time-duration threshold value.

3. A food processor (1) as claimed in claim 1, wherein the memory means (50) are designed for storaging the motor current value ($I_x$; $I_1$, $I_z$) present immediate y before the interruption of the at least one operating process and the operating-duration value ($T_x$; $T_y$, $T_z$) present immediately before the interruption of the at least one operating process.

4. A food processor (1) as claimed in claim 1, wherein the at least one activatable reactivating means (13, 14, 15, 16, 17, 18) is designed for reactivating the at least one previously interrupted operating process by means of the at least one activatable input means (13, 14, 15, 16, 17, 18) for switching on the at least one operating process.

* * * * *